(12) United States Patent
Udagawa

(10) Patent No.: US 7,055,830 B2
(45) Date of Patent: Jun. 6, 2006

(54) METAL LAMINATE GASKET

(75) Inventor: Tsunekazu Udagawa, Ichikawa (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/009,013

(22) Filed: Dec. 13, 2004

(65) Prior Publication Data

US 2005/0134005 A1    Jun. 23, 2005

(30) Foreign Application Priority Data

Dec. 19, 2003   (JP)   ............................ 2003-422648

(51) Int. Cl.
F02F 11/00         (2006.01)
(52) U.S. Cl. .................. 277/594; 277/595; 277/593; 277/600
(58) Field of Classification Search ........ 277/592–595, 277/600, 601
See application file for complete search history.

(56) References Cited

U.S. PATENT DOCUMENTS

| | | | |
|---|---|---|---|
| 4,759,556 A | | 7/1988 | Udagawa |
| 4,898,396 A | * | 2/1990 | Udagawa ..................... 277/592 |
| 5,058,908 A | * | 10/1991 | Udagawa ..................... 277/595 |
| 5,076,595 A | * | 12/1991 | Udagawa ..................... 277/595 |
| 5,092,613 A | * | 3/1992 | Udagawa ..................... 277/595 |
| 5,522,604 A | * | 6/1996 | Weiss et al. ................ 277/594 |
| 5,700,016 A | * | 12/1997 | Miyaoh et al. ............. 277/591 |
| 5,961,126 A | * | 10/1999 | Miyaoh ....................... 277/594 |
| 5,988,651 A | * | 11/1999 | Miyaoh ....................... 277/593 |
| 6,036,195 A | | 3/2000 | Udagawa |
| 6,089,572 A | * | 7/2000 | Plunkett ..................... 277/592 |
| 6,139,025 A | | 10/2000 | Miyaoh |
| 2005/0093248 A1 | * | 5/2005 | Udagawa ..................... 277/594 |

FOREIGN PATENT DOCUMENTS

| | | |
|---|---|---|
| EP | 0 369 033 A1 | 5/1990 |
| EP | 0 407 090 | 1/1991 |
| EP | 0 518 664 | 12/1992 |
| EP | 0 816 724 | 1/1998 |
| EP | 0816724 A1 * | 7/1998 |
| EP | 0 864 785 A2 | 9/1998 |

* cited by examiner

Primary Examiner—Patricia L. Engle
Assistant Examiner—Gilbert Lee
(74) Attorney, Agent, or Firm—Manabu Kanesaka

(57) ABSTRACT

A metal laminate gasket includes a first plate, intermediate plate and a second plate laminated together. The first plate has a curved portion for defining a hole to be sealed, and a flange extending outwardly from the curved portion. The intermediate plate is situated above the first plate laterally outside the flange. The second plate is situated above the intermediate plate and has a first bead disposed inside the intermediate plate and under the flange, and a second bead disposed outside the first bead and adjacent the flange. The second bead projects upwardly beyond the flange and has an inner section immediately outside the flange and an outer section outside the inner section. The inner section is inclined greater than the outer section.

7 Claims, 6 Drawing Sheets

METAL LAMINATE GASKET

BACKGROUND OF THE INVENTION AND RELATED ART STATEMENT

The present invention relates to a metal laminate gasket which includes two outer plates and one intermediate plate, specifically, the invention relates to the metal laminate gasket wherein secondary seal is strengthened around a seal hole.

Metal laminate gaskets, formed by laminating metal plates with seal means, have been used as gaskets for a connection portion between a cylinder block and a cylinder head of an internal combustion engine, other connection portions of internal combustion engine, and connecting portions of pipes.

In the internal combustion engines for automobiles, especially recent small-sized, light weight and high power engines, the size and weight of an engine are reduced, and a cylinder head and a cylinder block are formed with aluminum alloy with relatively weak rigidity. As a result, there is a tendency that rigidity of the engine decreases. Therefore, for sealing the gasket, if only a primary seal of a conventional cylinder hole (cylinder bore) is increased, for a recent engine which has factors that cause deformation of the engine, gas leak may be enhanced. Especially, deformation of the cylinder head becomes a problem as pressure rises inside the cylinder in the high powered engine.

The deformation of the cylinder head is small near a tightening bolt, and as the distance from the bolt is increased, the deformation becomes great, and as the distance is closer to the center of the cylinder bore wherein a large combustion pressure operates, deformation becomes great.

Following the deformation of the cylinder head, in order to obtain enough seal efficiency, it is necessary to provide not only the primary seal, but also the secondary seal effectively around the cylinder bore hole. Especially, in considering a partial deformation around the cylinder bore, since deformation of the center side is larger and a peripheral side is smaller, it is important to obtain a surface pressure distribution where a seal surface pressure is large at an inner side and gradually becomes smaller towards to the peripheral side so as to follow such inclined deformation.

On the other hand, regarding the metal laminate gasket, followed by a reduction in size, weight, and cost of the engine, number of lamination is reduced and also an adaptable seal method is simplified. As a relatively simple structured metal laminate gasket, there is a gasket composed of two surface plates and one intermediate plate.

For the metal laminate gasket formed of three metal plates, several cylinder head gaskets were formed wherein secondary seal was gradually increased to handle a partial deformation of the cylinder block and cylinder head of a small engine.

The cylinder head gasket is provided, for a seal hole such as cylinder bore, with a primary seal and a secondary seal outside the primary seal, wherein in the surface pressure distribution of the secondary seal, inside thereof is the largest, and the outside becomes gradually smaller.

For this example, a metal laminate gasket shown in FIG. 8 and modified metal laminate gasket shown in FIG. 9 were examined.

For these metal laminate gaskets, a first bead is formed in an inner peripheral side of a shoulder portion of a first surface plate to form a primary seal. In order to protect the first bead from the high heat combustion gas, a second surface plate is folded back, and a circumferential edge of the folded plate is opposed with the shoulder of the first surface plate.

Also, to form the secondary seal, a second bead 71 (FIG. 8) is formed in an intermediate plate 70 for conventional gasket in FIG. 8 and FIG. 9, and a shim 80 (FIG. 9) is placed on the intermediate plate 70A. In order to provide the intermediate plate 70 and 70A between the first surface plate 50 and second surface plate 60, a shoulder 52 is formed between the first bead 51 and second bead 71 in the first surface plate 50.

However, for the metal laminate gaskets 5, 5A in FIG. 8 and FIG. 9, it is impossible to generate large surface pressure on the shoulder 52 by tightening the gasket 5 and 5A because the first bead portion 51 is disposed under a folding portion 61 of the secondary surface plate 60 by gradually bending the shoulder 52 of the first surface plate 50.

Therefore, in the secondary seal strengthening method, as shown in the surface pressure distribution in FIGS. 8 and 9, it becomes a mountain type where a large surface pressure is in the center or a rectangular type with plain surface pressure. As shown in FIG. 10, like a recent cylinder head with relatively small rigidity, a center side of the cylinder bore 2 separates from the cylinder block 9 and this deformation becomes smaller toward the outside of the cylinder bore 2. In other words, there is a problem that enough seal effect can not be obtained when deformation with inclination occurs.

On the other hand, the present inventor proposed a metal laminate gasket, wherein in a shoulder portion of a first outer plate which is located close to a folding back portion of a second outer plate, a bending portion is formed by bending the first outer plate in a step form to have a clank or z-shape in a cross section to thereby generate a large seal pressure at the shoulder portion (for example, refer to Patent Publication 1). This method is applied to the invention.

Patent Publication 1: Japanese Patent Publication No. 10-38086.

In view of the problems described above, an object of the present invention is to provide a metal laminate gasket which can generate a primary seal generated at a first bead located inside a folding back portion surrounding a seal hole, and a secondary seal which has a pressure distribution with high peak from the inner side to the outer side around the primary seal.

Further objects and advantages of the invention will be apparent from the following description of the invention.

SUMMARY OF INVENTION

In order to attain the objects described above, according to the present invention, a metal laminate gasket includes two surface plates and one intermediate plate; on the first bead surrounding a seal hole of the first surface plate, a folding back portion of the second surface plate which is folded back around the seal hole is laminated; and the intermediate plate is arranged outside the first bead. A second full bead protruding outwardly from a surface of the folding back portion is formed outside the first bead and adjacent to an outer peripheral edge of the folding back portion in the first surface plate, and an inner inclination of the second full bead is formed greater than an outer inclination thereof.

That is, in the gasket with a cylinder bore folding type, in the first outer plate having the first bead and laminated to the second outer plate with the folding back portion, the second full bead having an uneven inclination portion near a tip where the inclination portion is steeper than the other is arranged at the tip of the folding back portion. In this structure, a large sealing surface pressure is locally obtained by utilizing a strength of compression resistance of the steep inclination portion of the second full bead in compressing the gasket.

The second full bead is formed with circular arc shape or trapezoid shape, but the first bead is not limited to the full bead. It may be either a full bead or half bead.

Since the height of the secondary full bead H2 is ΔH higher than the height of folding portion H1, when the gasket is tightened, the second full bead is compressed, and reaction force is generated against the compression to thereby generate high surface pressure which improves seal capability on this portion. In this way, it is possible to generate large seal surface pressure because inside of the secondary full bead is formed in the steep side inclination. The inclination of the inner side and outer side, and the height H2 of the second full bead or ΔH are set and selected to obtain the surface pressure which is necessary for seal object.

According to this structure, the primary seal is formed by the first bead of the first surface plate, and a size and a distribution of the surface pressure which is generated from the primary seal are determined by the material of the first outer plate and the shape of the first bead. Also, the first bead is protected by the folding back portion of the second surface plate from combustion gas. Especially, the large surface pressure generated inside the second full bead is determined by the quality of the first metal plate and the form of the second full bead. Also, the surface pressure continued therefrom is determined by the quality and the thickness of the intermediate plate.

And, the metal laminate gasket is able to obtain high seal surface pressure at the vertical portion if inclination of the inner inclination portion of the second bead is formed vertically to flat surface of the gasket. Therefore, the surface pressure distribution with higher peak can be generated at the secondary seal.

Also, in the metal laminate gasket, a peak can be generated outside the second bead as well as inside the second bead if the second bead is formed with a trapezoidal shape. Also, the outside peak is smaller than the inside peak because the inner inclination is larger than the outside inclination.

As described above, the present invention is a method from the conventional primary seal strengthening structure to the secondary seal strengthening structure. In stead of strengthening the primary seal by generating a concentration stress around the seal object such as cylinder bore, prevention of a gas leak and reduction of the deformation of the engine are made by distributing the concentration stress around the seal object hole by strengthening the secondary seal.

As described above, according to the metal laminate gasket of the present invention, the primary seal generated by the first bead retained in the folding back portion surrounding the seal hole and the secondary seal having a pressure distribution with high peak around the primary peak are formed.

And, the amount and distribution of the surface pressure generated at the primary seal are determined by a form of the first bead and a quality of the first surface plate. The amount and distribution of the surface pressure generated by the second full bead at the secondary seal are mainly determined by a form of the second full bead, a quality of the first metal plate, and especially an inclination of the inside inclination portion.

Therefore, in regard to the cylinder head wherein rigidity is small, the center side of the cylinder bore is located away from the cylinder block and becomes smaller toward the outside of the cylinder bore, which generates inclination deformation, the gasket can provide sufficient secondary seal. Namely, the secondary seal having desirable surface pressure distribution which has a relatively high surface pressure at the seal hole side to a very high surface pressure can be obtained.

BRIEF DESCRIPTION OF THE DRAWINGS

in FIG. 5(b), the second bead is a trapezoid shape full bead; in FIG. 5(c), the second bead is the trapezoid shape full bead and an inner inclination portion is vertical; FIG. 5(d) is an example of a combination of a half bead of the first bead and a trapezoid shape full bead as the second bead; FIG. 5(e) is an example of a combination of the half bead of the first bead and the trapezoid shape full bead as the second bead, and the inner inclination portion is vertical;

DETAILED DESCRIPTION OF PREFERRED EMBODIMENTS

Hereinafter, a metal laminate gasket of the present invention will be described in detail with reference to the attached drawings. FIG. 1 to FIG. 9 are diagrams wherein a plate thickness of the gasket, measurement and aspect ratio of the seal groove and bead are different from those of the actual sizes, making it easy to understand by enlarging the seal portion.

Figure 1:
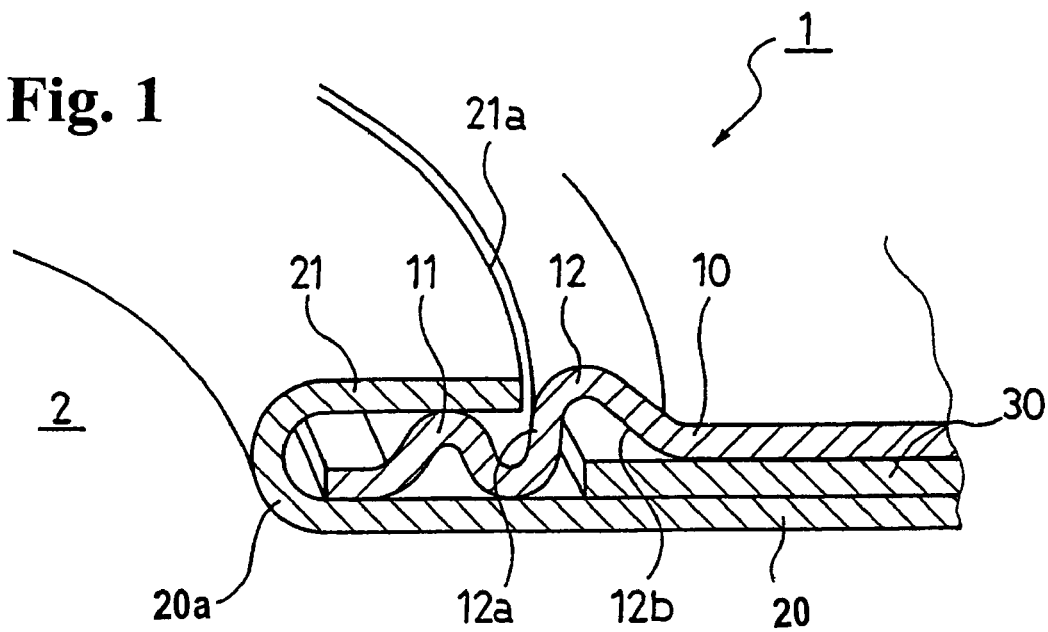
FIG. 1 is a partial perspective view with a section of a metal laminate gasket according to a first embodiment.
Figure 2:
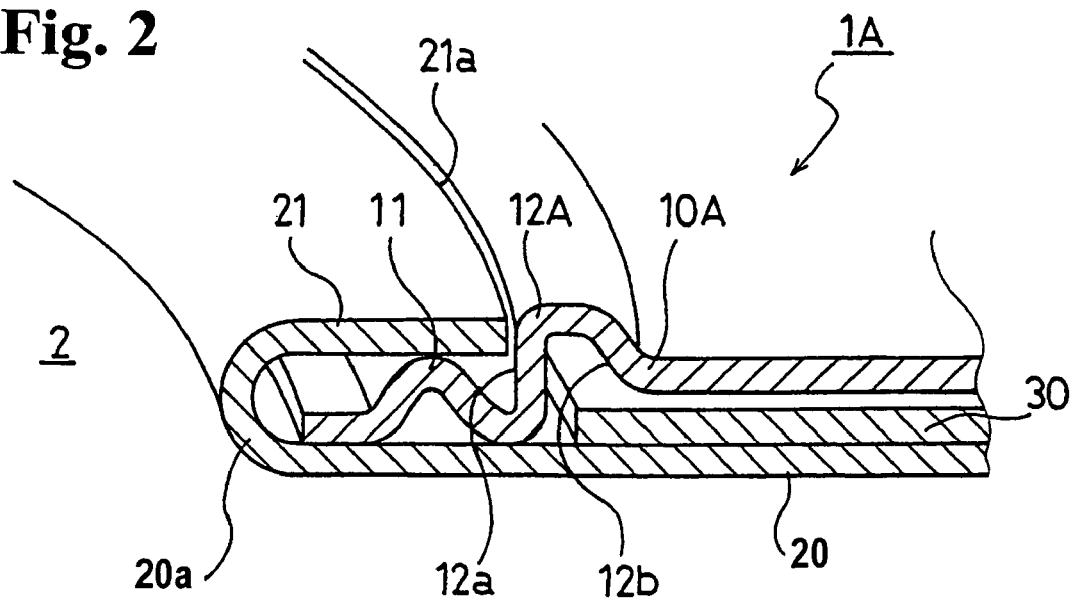
FIG. 2 is a partial perspective view with a section of the metal laminate gasket according to a second embodiment.

The metal laminate gasket 1, 1A according to embodiments of the present invention shown in FIG. 1 and FIG. 2 are metal gaskets which are placed between a cylinder head and a cylinder block (cylinder body) of the engine, and seal liquid such as oil or coolant water from liquid passages and high temperature and high pressure combustion gas from the cylinder bore.

According the first and second embodiments of the present invention, the metal laminate gasket 1 (1A) has three structure plates, i.e. a first surface plate 10 (10A), a second surface plate 20, and an intermediate plate 30. The first surface plate 10 (10A) and the second surface plate 20 are formed by soft steel plate or stainless annealing material, and the intermediate plate is formed by spring steel plate.

In the metal laminate gasket shown in FIG. 1, the first surface plate includes a first bead (full bead) 11 surrounding a seal hole 2, and a circular arc shape second full bead 12 around the first bead 11. Also, the intermediate plate 30 is placed outside the first bead 11 and under the second full bead 12.

And, the second surface plate 20 wherein the intermediate plate 30 and the first surface plate 10 are laminated is folded back around the seal hole 2, covering the first bead 11 by a folding portion or flange 21, so that a circumference edge 21a of the folded portion 21 and an inner inclination portion 12a of the second full bead are located adjacent to each other. Namely, the second surface plate 20 includes a curved portion 20a and the flange 21.

In the present invention, an inclination of the inner inclination portion 12a of the second full bead is formed larger than an inclination of the outside inclination portion 12b. With this structure, a surface pressure generated at inner inclination portion 12a can be significantly large.

Figure 3:
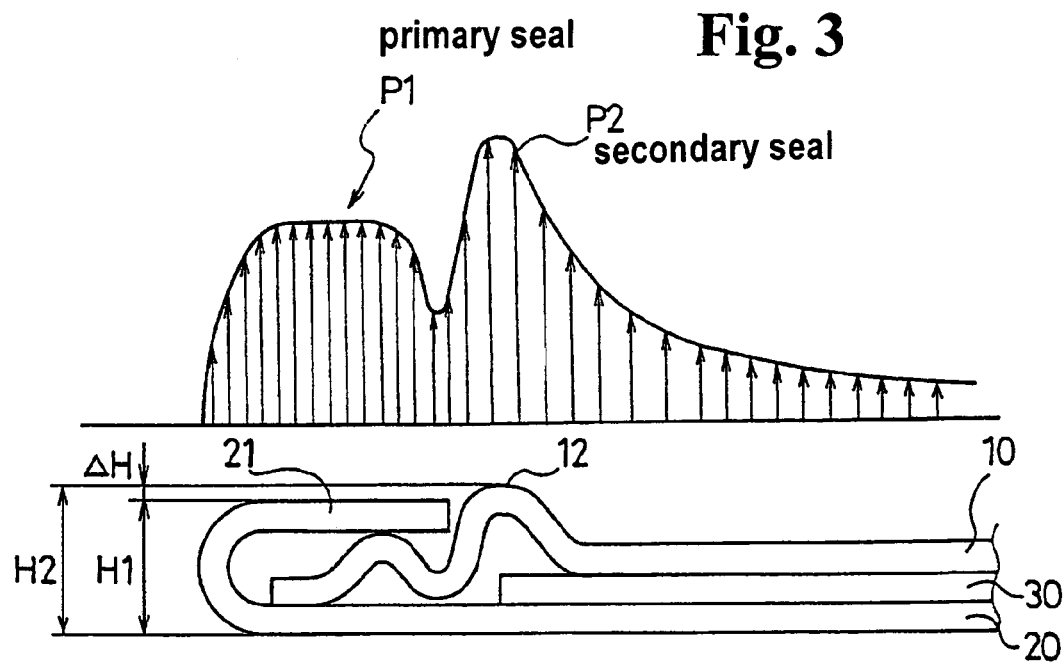
FIG. 3 is a diagram of a seal surface pressure distribution of the metal laminate gasket according to the first embodiment.
Figure 4:
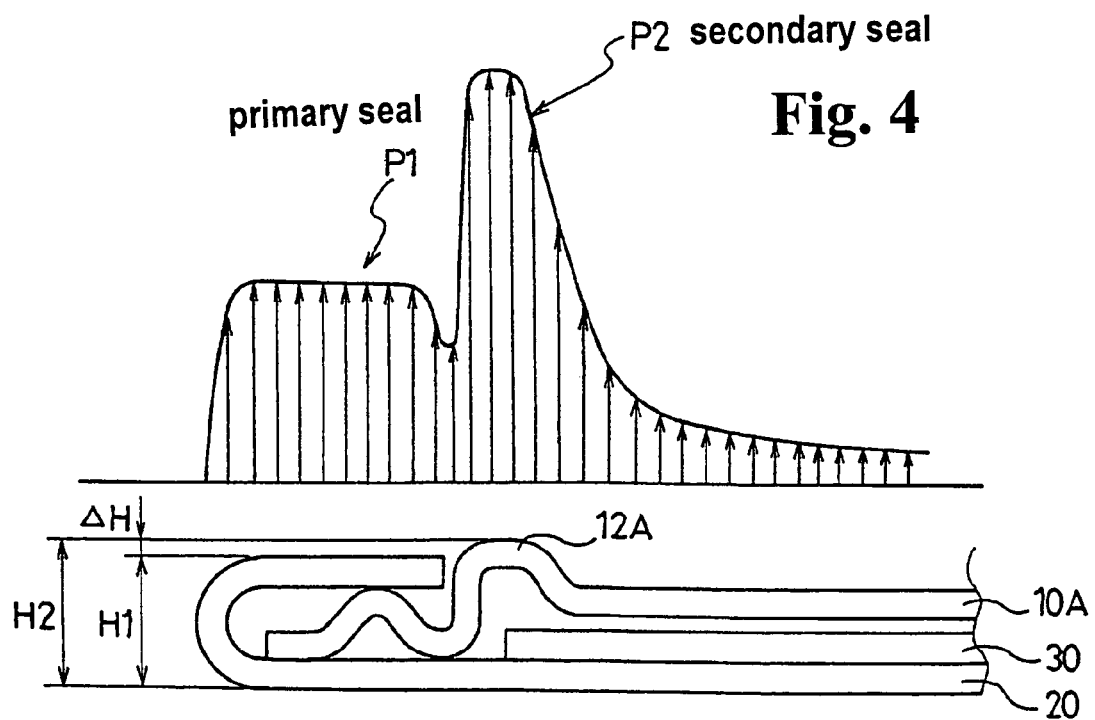
FIG. 4 is a diagram of a seal surface pressure distribution of the metal laminate gasket according to the second embodiment.

As shown in FIG. 3, the height H2 of the second full bead 12 is slightly higher (about 0.2~0.5 mm) than that of the folding back portion 21 of the surface height H1 (ΔH). With this structure, when the gasket 1 is tightened, high surface pressure (shown as an arrow P2 in FIG. 3) can be generated by compressing the second full bead 12.

According to the metal laminate gasket 1 with the above structure thus described, a primary seal is formed by the first bead 11 of the first surface plate 10, and a favorable secondary seal can be formed because a large surface pressure can be generated by the second full bead 12.

And the amount and distribution P1 of the surface pressure distribution P1 generated at the primary seal are determined by a form (thickness, bead kind, width, height, etc.) of the first bead 11 and quality of the first surface plate 10.

Also, for the secondary seal, the surface pressure P2 generated at the second full bead 12 can be determined by a form (thickness, bead height, inclination, especially inner inclination, etc.) of the second full bead 12 and the quality of the first surface plate 10.

Therefore, for a cylinder head with relatively smaller rigidity wherein a central side of the cylinder bore separates from the cylinder block, and this deformation becomes smaller toward outside of the cylinder bore, i.e. for the case of forming deformation generating inclination, the gasket can seal properly. In other words, as shown in FIG. 3, from the seal hole side, it is possible to provide a desirable surface pressure distribution having the primary seal with relatively high surface pressure, and the secondary seal with significantly high surface pressure and the gradual declination.

In addition, because the first bead 11 can be protected by the folding back portion 21 of the second metal plate 20, the gasket has durability and be able to maintain a long favorable seal surface pressure distribution.

And, for the metal laminate gasket 1A according to the second embodiment shown in FIG. 2, the inclination of the inner inclination portion 12a at the second full bead 12A is formed vertically to the flat surface, that is, vertically to the first surface plate 10A and the second surface plate 20.

With this structure, a surface pressure distribution with a peak which is higher than the metal laminate gasket 1 of the first embodiment can be generated at the secondary seal because significantly high seal surface pressure can be obtained at this vertical point.

And other embodiments of the metal laminate gasket 1B~1F are shown in FIGS. 5(a)–5(e).

Figure 5A:
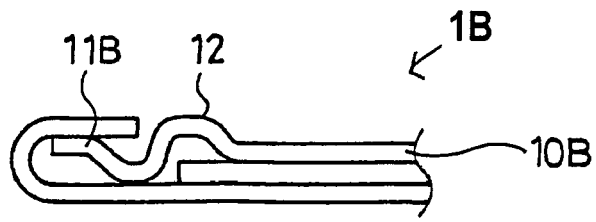
FIGS. 5(a)–5(e) are cross sectional views of the metal laminate gasket according to other embodiments, wherein in FIG. 5(a), the first bead is half bead.
Figure 5B:
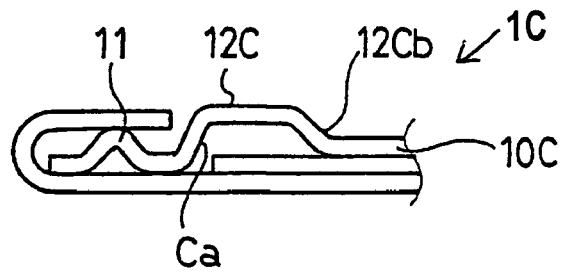
Figure 5C:
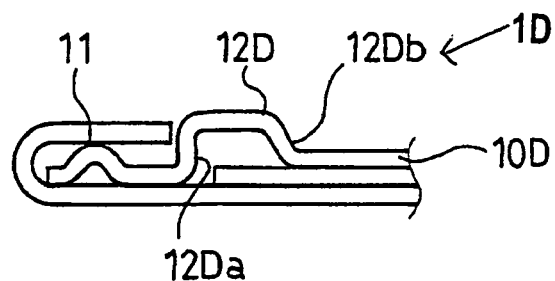
Figure 5D:
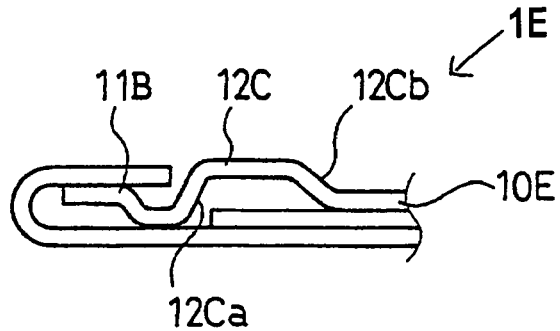
Figure 5E:
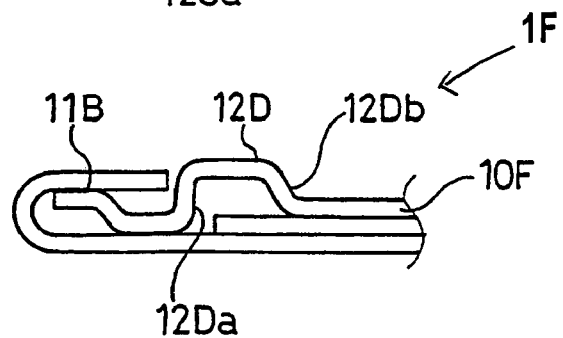

For a metal laminate gasket 1B of the third embodiment shown in FIG. 5(a), the first bead 11B is formed by a half bead; and for the metal laminate gasket 1C and 1D of the forth and fifth embodiments shown in FIG. 5(b) and FIG. 5(c), the full beads 12C and 12D are formed in a trapezoid shape, wherein an inner inclination portion 12Ca of the second full bead 12C shown in FIG. 5(b) is smaller than 90°, and an outside inclination portion 12Cb is smaller than the inner inclination portion 12Ca. Also, an inner inclination portion 12Da of the second full bead 12D shown in FIG. 5(c) is formed vertically (90°), and an outside inclination portion 12Db is smaller than 90°. And, in FIG. 5(d) and FIG. 5(e), the first bead is formed by a half bead 11B, and the second bead is formed by trapezoid shape full beads 12C, 12D.

Figure 6:
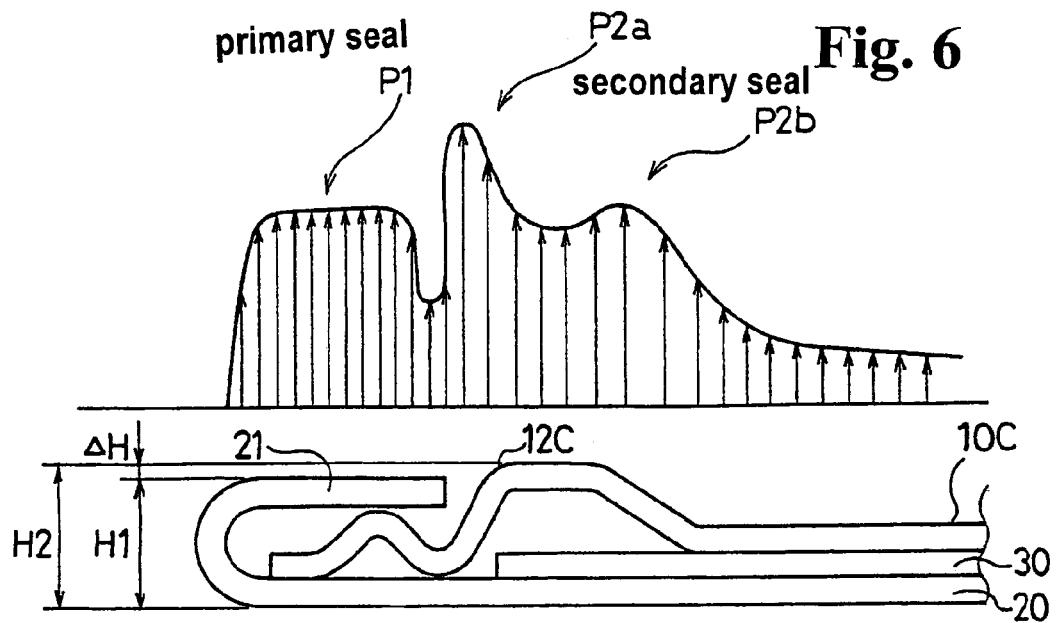
FIG. 6 is a diagram of a seal surface pressure distribution of the metal laminate gasket according to a third embodiment.
Figure 7:
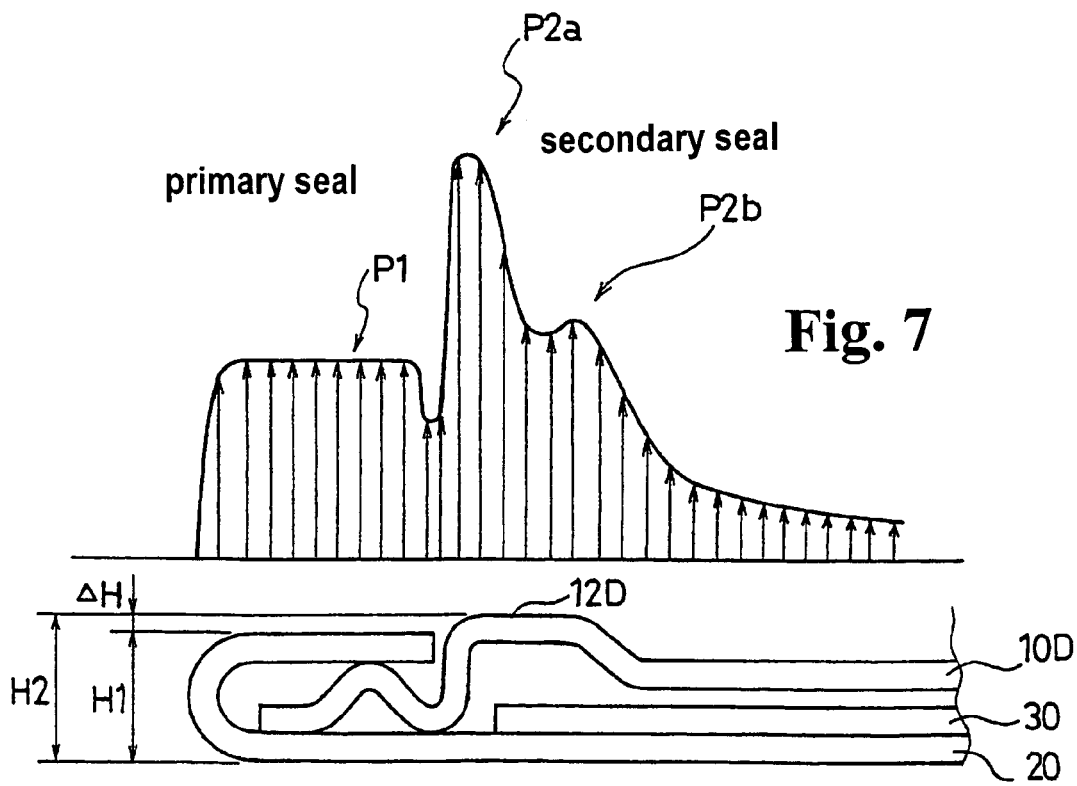
FIG. 7 is a diagram of a seal surface pressure distribution of the metal laminate gasket according to a fourth embodiment.
Figure 8:
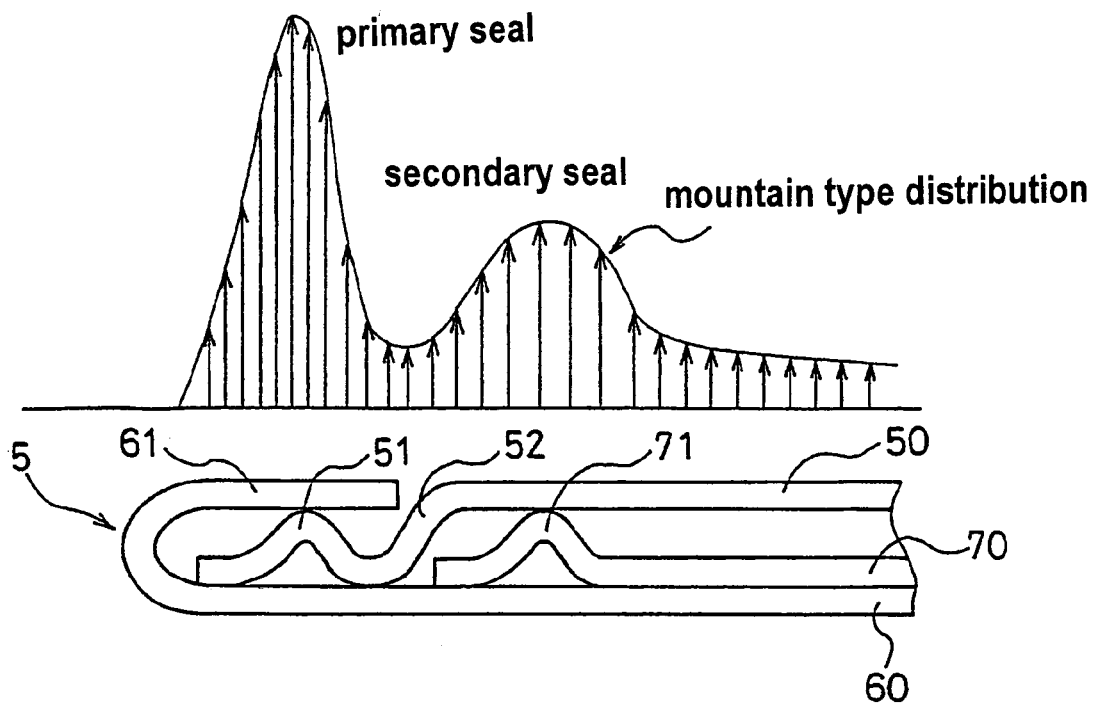
FIG. 8 is a diagram of a seal surface pressure distribution of the metal laminate gasket before improvement.
Figure 9:
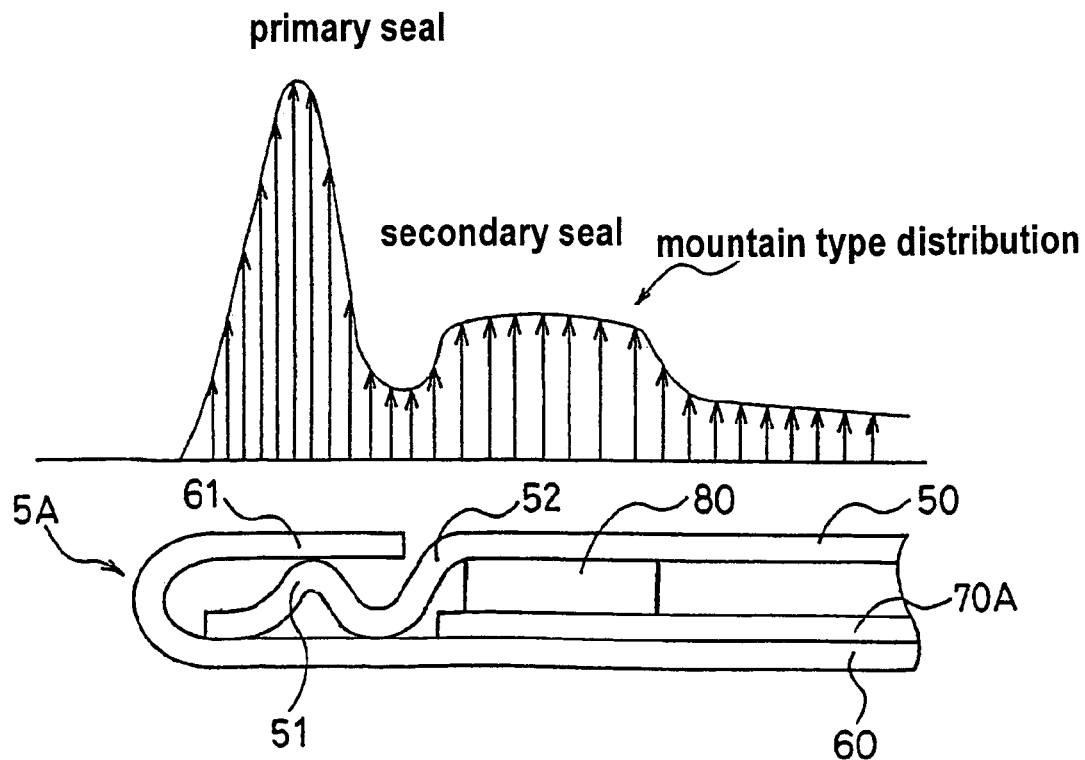
FIG. 9 is a diagram of a seal surface pressure distribution of another metal laminate gasket before improvement.
Figure 10:
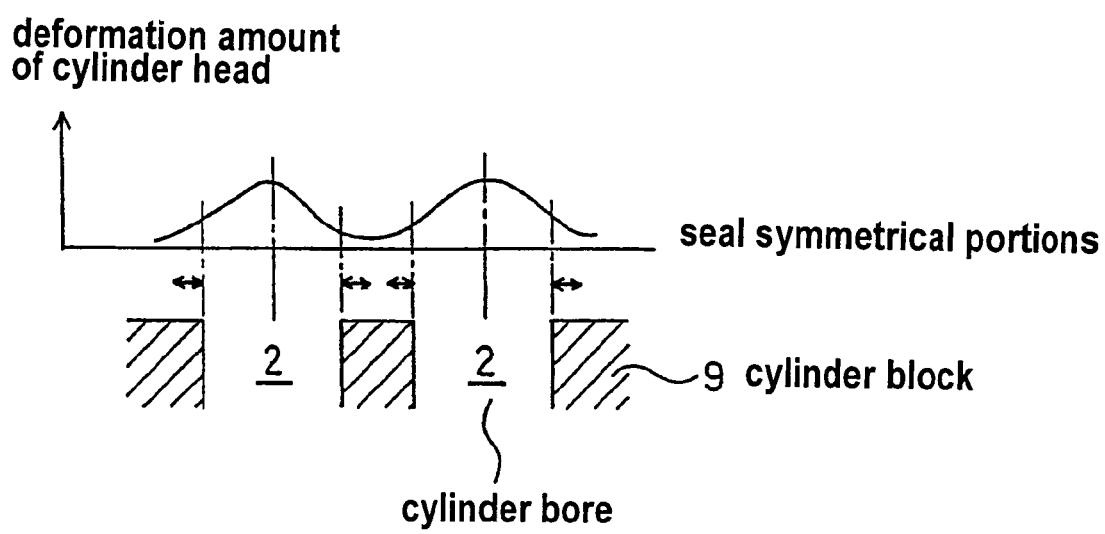
FIG. 10 is a diagram of a deformation amount of a cylinder head.

According to a structure of this trapezoid shape second full bead 12C or 12D, for the secondary seal as shown in FIG. 6 and FIG. 7, a surface pressure distribution with peak P2b can be generated not only outside an inclination portion Cb but a peak P2a at the inner inclination portion 12, so that more wide surface pressure distribution can be obtained to thereby improve the seal effect.

The disclosure of Japanese Patent Application No. 2003-422648 filed on Dec. 19, 2003 is incorporated in the application.

While the invention has been explained with reference to the specific embodiments of the invention, the explanation is illustrative, and the invention is limited only by the appended claims.

What is claimed is:

1. A metal laminate gasket comprising:
   a first plate having a curved portion for defining a hole to be sealed, and a flange extending outwardly from the curved portion,
   an intermediate plate situated above the first plate laterally outside the flange, and
   a second plate situated above the intermediate plate and having a first bead disposed inside the intermediate plate and under the flange, and a second bead disposed outside the first bead and adjacent the flange, said second bead projecting upwardly beyond the flange and having an inner section immediately outside the flange and an outer section outside the inner section, said inner section being inclined greater than the outer section.

2. A metal laminate gasket according to claim 1, wherein said inner section is formed vertically relative to a flat surface of the first plate.

3. A metal laminate gasket according to claim 1, wherein said second bead is formed in a trapezoid shape.

4. A metal laminate gasket according to claim 1, wherein said first bead is a full bead projecting toward the flange.

5. A metal laminate gasket according to claim 1, wherein said first bead is a half bead, an inner side of the half bead contacting the flange.

6. A metal laminate gasket according to claim 1, wherein said first bead provides a primary seal, and said second bead provides a secondary seal, said secondary seal being greater in pressure than the primary seal when the gasket is compressed.

7. A metal laminate gasket according to claim 6, wherein said secondary seal has an inner portion formed by the inner section, said inner portion providing sealing pressure greater than that formed by the outer section and the primary seal.

* * * * *